Figure 1:
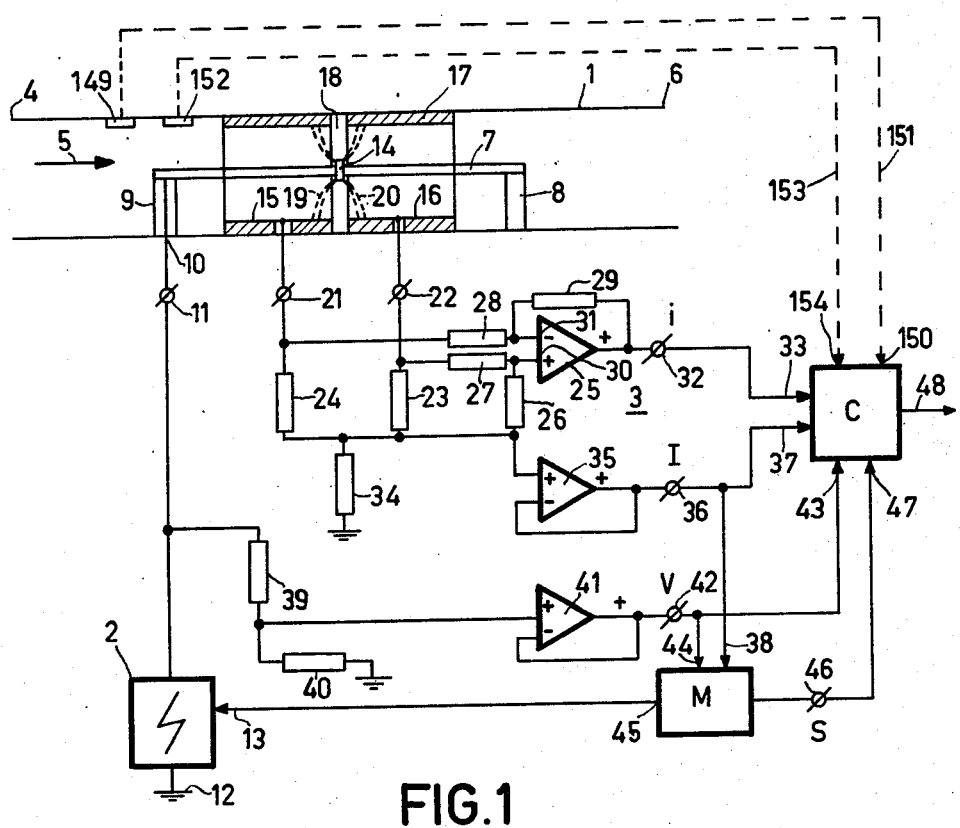

United States Patent [19]

Weistra

[11] 4,272,995

[45] Jun. 16, 1981

[54] IONIZATION FLOW METER

[75] Inventor: Marten P. Weistra, Eindhoven, Netherlands

[73] Assignee: U.S. Philips Corporation, New York, N.Y.

[21] Appl. No.: 45,043

[22] Filed: Jun. 4, 1979

[30] Foreign Application Priority Data

Jun. 26, 1978 [NL] Netherlands ............ 7806827

[51] Int. Cl.³ .................................................. G01F 1/56
[52] U.S. Cl. ................................................... 73/861.09
[58] Field of Search ............................ 73/194 F, 861.09

[56] References Cited

U.S. PATENT DOCUMENTS 3,648,517  5/1972  Dorman ............................. 73/194
3,835,705  9/1974  Hadjidjanian ..................... 73/194

Primary Examiner—Herbert Goldstein
Attorney, Agent, or Firm—Thomas A. Briody; William J. Streeter; Bernard Franzblau

[57] ABSTRACT

An ionization flow meter which can determine with high accuracy the flow of a gas expressed as a gas velocity, volume flow, or mass flow and substantially independently of pressure, temperature and, as the case may be, moisture content. By applying the theory of corona discharges, data relating to the flow-determining factors such as ion mobility and gas density can be derived from the known measured voltage and current values using electronic means. For example, the slope S of the I-V characteristic curve can be determined from the measured values of voltage V and current I.

17 Claims, 4 Drawing Figures

IONIZATION FLOW METER

The invention relates to an ionisation flow meter for gases in which an ion beam produced between an anode and a cathode is deflected as a result of the passage of the gas. The meter comprises a high voltage source connected to the anode and cathode for generating the ion current, and a measuring device for measuring the deflection and for determining a quantity which is proportional to the gas flow. The measuring device comprises a voltage measuring device for the voltage V between anode and cathode, a first current measuring device for the total ion current I, a second current measuring device for a difference current i, which is a measure of the deflection, and a calculating unit with operational amplifiers and multiplication circuits having inputs for the quantities measured and having an output for the first mentioned quantity.

Such a flow meter is known from U.S. Pat. No. 3,648,517. A gas stream is passed through a tube which is provided with an anode and a cathode. These take the form of a disc, mounted on a rod, which is mounted on supports in the axial direction of the tube, and of a cylinder of a resistance material arranged along the inner wall of the tube. The disc serves as the ion source and the cylinder as the ion collector. The high voltage source is arranged between the rod and cylinder via external connections. The voltage has been selected so that a corona discharge is produced and a current of ions flows from the disc to the cylinder in the radial direction. If the velocity of the gas is zero, half the ion current is available at a connection at the one end of the cylinder, the other half at a connection at the other end. If the velocity of the gas is not zero, the ions will obtain a velocity component in the axial direction. The entire ion beam is thus displaced and the location of impingement on the ion collector is now shifted. As both end connections are maintained at the same potential, the resistance of the ion collector will produce a current distribution for which the electric current $i_2$ to the connection downstream of the gas flow is greater than half the ion current I and the electric current $i_1$ to the upstream connection is smaller.

Assuming that the ion beam consists of a parallel current of ions with the same radial and axial velocity, it will be appreciated that the deflection D of the beam is on the one hand proportional to the axial velocity $v_{ax}$ divided by the radial velocity $v_{rad}$, i.e. the velocity of the gas divided by the velocity as a result of the electric field, and on the other hand is proportional to the difference $i=i_2-i_1$ divided by the total current I, i.e.

$$D = \tfrac{1}{2} L \cdot (i/I) \qquad (1)$$

and $$D = r \cdot (v_{ax}/v_{rad}) \qquad (2)$$

where L represents the length of the ion collector between the connections and r the distance between the ion source and the ion collector.

In practice it is found that formulas (1) and (2) may also be applied with a high accuracy in those cases where the ion beam does not comply with the aforementioned assumption, as is the case with the known device. For the said velocities an average velocity is taken. Similarly, an average mobility m of the ions is adopted and the local field strength is assumed to be proportional to the applied voltage V, so that inserted in the definition for mobility this yields $$m = C_m \cdot (V_{rad}/V) \qquad (3)$$

where $C_m$ is a constant. From (1) and (2) it follows that:

$$i = C_l \cdot I \cdot (v_{ax}/v_{rad}) \qquad (4)$$

where $C_l = 2 r/L$. If 4 is combined with 3, this yields:

$$i = C_l \cdot C_m \cdot 1/m \cdot I/V \cdot v_{ax} \qquad (5)$$

or $$v_{ax} = m/C_l C_m \cdot V/I \cdot i \qquad (6)$$

Formula (6) multiplied by the effective area 0 for the cross-section through which the gas flows, yields a new formula (7), which represents a volume flow $F_v$:

$$F_v = O \cdot m/C_l \cdot C_m \cdot V/I \cdot i \qquad (7)$$

Formula 7 multiplied by the density d of the gas yields formula (8), which represent the mass flow $F_m$ of the gas:

$$F_m = (O \cdot m \cdot d/C_l \cdot C_m) \cdot (V/I) \cdot i \qquad (8)$$

Assuming that the product of mobility and density is constant and that furthermore the ratio V/I is maintained constant, formula (8) demonstrates that a mass flow of a gas can be measured by measuring the current i.

The mass flow meter in accordance with the aforementioned U.S. Patent is based on this conception. For this purpose there is provided a calculating unit comprising operational amplifiers and resistors constituting bridge circuits which, when correctly adjusted, represent multipliers. The voltage V, the total current I, and the difference current i are measured and the ratio V/I being maintained constant by a control circuit which is connected to the high voltage source. At an output a voltage is available which is proportional to i and thus indicative of a mass flow in accordance with formula (8).

The general use of this flow meter is seriously limited by the fact that the product m.d must be constant. This product is formed to be independent of the pressure and thus of the density of the gas in a wide range around one atmosphere ($10^5$ pascal), but is not independent of the temperature of the gas and is not independent of any contaminants, including water vapour. In respect of the density it is to be noted that this is proportional to the pressure, inversely proportional to the absolute temperature and may require a correction for the water vapour content, whereas the mobility is inversely proportional to the density and at constant density is found to increase at increasing temperature and to decrease at increasing moisture content for specific gases. For atmospheric air, for example, under greatly varying climatological conditions such as 100 degrees centigrade temperature difference and a relative humidity from 10 to 90%, the product of mobility and density may vary by some tens of percent.

The invention is based on the conception that it is necessary to measure the mobility and, if required, the density, in order to obtain a flow meter which enables the gas velocity, the volume flow or the mass flow to be measured with a high accuracy, for example better than 1%, with greatly varying gas characteristics, such as pressure, temperature and moisture content.

In order to realize these measurements the invention proposes to use the formulas known from the literature, relating to corona discharges and to the previously derived formulas (6), (7) and (8).

To this end an ionisation flow meter of the type mentioned in the preamble is characterized in that the measuring device comprises a modulator coupled to the high voltage source and which periodically varies the operating point at the current I and the voltage V on the I-V curve by an amount dI for the current and dV for the voltage, and which supplies a signal to another input of the calculating unit, which is a measure of the slope S, defined as dI divided by dV, in the operating point. The calculating unit derives the said quantity, which is proportional to the flow rate of the gas and which is independent of physical parameters such as pressure and temperature, from the quantities measured, using a corona current formula I as a function of V and a deflection formula i as a function of the deflection.

Thus, the invention provides a very accurate anemometer which can be manufactured simply and cheaply with electronic means.

In another embodiment a volume flow meter is obtained by including a multiplication constant in the calculating unit.

A further embodiment of the invention is characterized in that the calculating unit operates with a multiplication factor which is proportional to the density of the gas so that said quantity is expressed in mass flow of the gas. In the calculating unit the density can then be calculated from the gas constant, the temperature and the gas pressure, for which purpose suitable transducers for the temperature and pressure may be arranged in the gas stream.

However, the invention also provides a mass flow meter comprising a calculating unit which computes the density from the electrical quantities measured, such as V and S, using formulas which can be derived from the gas discharge theory. This theory demonstrates that there exists a more or less parabolic relationship between the starting voltage $V_s$, at which the corona discharge commences, and the pressure, i.e. the density of the gas. As the applied voltage V is again related to $V_s$ a formula can be obtained in which the density is expressed in the voltage V. Minor correction terms for moisture content and temperature may be inserted in the formula using the slope S so that a relationship is obtained between the density d and the electrical quantities measured which is accurate within 1%.

An advantage of the invention is that by simple electronic means the variables defining the flow of a gas can be calculated from the known measurement values of V, I and i and the value obtained by measuring the slope S of the I-V curve at the operating point, as proposed by the invention. Now, both a mobility measurement and a density measurement are possible. It will be evident that a measurement of the voltage V and the total ion current I may also be employed for influencing a control circuit in the high voltage source. The ionisation flow meter may then operate with constant V, constant I or also with constant V/I. The inputs of the calculating unit for these quantities may then often be dispensed with or be replaced by a multiplication constant in the calculating unit. However, constant-voltage control has the drawback that the current operating point varies substantially owing to the slope of the I-V curve, which may give rise to instabilities in the corona discharge. A V/I control yields a more stable operating range, and so does constant current control.

The modulator used for the invention comprises an oscillator which supplies a signal to the high voltage source such that a small variation of the operating point is obtained, which may be expressed as the voltage $V \pm dV$ and as the current $I \pm dI$. The modulator can now measure the values dV and dI, for example via sample-and-hold circuits, which are also controlled by the oscillator. The slope S is then obtained by means of a dividing circuit. In this case it is also possible to obtain a simplification by maintaining one of the difference values constant and measuring the other value. In the case of a constant I control it will therefore be advantageous to employ constant dI modulation. By means of one sample-and-hold circuit dV can then be measured and be applied to the calculating unit as a measure of S, namely 1/S.

Modulation of the high voltage source can be achieved in many ways, for instance by varying the internal resistance in the secondary circuit by including an alternating voltage source, controlled by the oscillator of modulator M, in series with the secondary circuit, by switching in or out a smaller high voltage source, or by varying a parameter in the primary circuit of the DC-DC converter used, for example the pulse width. The methods acting in the secondary circuit can be fast, while the primary switching method will take more time. The modulator M should be arranged so that a measurement of dI and dV is possible, and that a well-defined value for the slope S is obtained. Modulation techniques may then be employed using tuned filters and smoothing means. Alternatively, sample-and-hold circuits may be adapted so that peak values are stored. These measurement techniques may be the cause of the fact time delay in the slope measurement, i.e. that an S-measurement takes several seconds until, in the case of a stepwise change of the gas parameters, a new value is reached.

As all electrical quantities measured contain a modulation ripple, filters and smoothing means may be employed in order to obtain an average value for V, I and i. Preferably, the time constants are selected the same for all measurements.

However, if rapid changes of the gas parameters should be detected and an accurate flow measurement is necessary, the various time constants should be adapted thereto or, if this is not possible, a measuring method with data processing should be selected which ensures a fast response.

To this end it is advantageous in accordance with other embodiments of the invention to use the factors as contained in the formula for the output quantity and the physical properties of the product of the mobility of the gas ions and the gas density. Accordingly an ionisation flow meter in accordance with the invention is characterized in that the calculating unit comprises multipliers which derive the value V.i/I from the measuring values V, I and i, which value is contained in the quantity to be measured as a factor.

From formulas (6), (7) and (8) it follows that the value V.i/I occurs as a factor therein. In the case of constant gas properties and a constant flow, this factor will also be constant and consequently be independent of electrical variations. This also means that the modulation with dV and dI does not result in a change of said factor so that an automatic filtering action for the modulation is obtained. Consequently, separate filters and smoothing means are not necessary and the factor will respond to variations in the gas properties immediately or with negligible delay.

This fast response is in particular advantageous for a mass flow meter. The properties of the product of mobility and density may then be used. To this end an embodiment of the ionisation flow meter in accordance with the invention is characterized in that the calculating unit comprises multipliers, which determine a value m.d which is proportional to the product of the mobility of the gas ions m and the density of the gas d, and that the measuring circuit includes time-constant circuits for these quantities so that the time constants in the measuring device for measuring these quantities are virtually equal, as a result of which the value m.d is substantially independent of sudden pressure variations of the gas.

If moreover rapid temperature variations are anticipated, for which allowance is to be made in the flow measurement, the slow m.d measurement may be corrected for its temperature dependence by dividing the product m.d by a value which is a function of this temperature dependence. For this purpose a function generator should be employed which generates this function in response to the gas temperature measured and which supplies a signal having said value. If this signal is now passed through a delay circuit which has the same time constant as the m.d product and is subsequently used as the divisor for this product, the result will be independent of the gas temperature. Subsequently, the mass flow measurement can be corrected by multiplying the result by the direct signal, which is fast and is not delayed in respect of its step function. Thus, a flow meter is obtained which responds rapidly to temperature and pressure variations. A substantial improvement is already achieved when the temperature transducer is for example made of a semiconductor material and the function generator is an amplifier so that a voltage is available at its output which is proportional to the absolute temperature T in degrees Kelvin. For example for atmospheric air m.d/T is found to be constant over a reasonable temperature range.

If the temperature function is more intricate, the function generator may comprise some adder, substractor and multiplier circuits corresponding to the function blocks in the calculating unit.

A different embodiment of the invention is characterized in that a temperature transducer is arranged in the gas stream and is connected to a function generator which supplies a temperature dependent signal to the one input of a multiplier and to a time delay circuit having a time constant equal to the time constant of the value m.d. Further the output of the time delay circuit is connected to the division input of a divider, whose multiplication input receives the value m.d, and the output of the divider is connected to the other input of the multiplier and supplies a signal which is independent of the gas temperature.

A further embodiment of the ionisation flow meter in accordance with the invention is intended for measuring the mass flow of atmospheric air. To this end this embodiment is characterized in that the high voltage source comprises a control unit which maintains the total ion current I constant, the modulator supplies a periodic signal to the control input of the high voltage source so that the current I varies by a fixed amount dI, and the modulator comprises a measuring input for the high voltage V, derives the amount dV corresponding to dI from this voltage and supplies a signal which is proportional to dV as a measure of the slope S, and the calculating unit calculates the density d of the air in accordance with $d = C_3 \cdot V(V + y + x/S)$, where $C_3$, y and x are constants, so that at the output of the calculating unit a signal is available which is proportional to the mass flow of air and which is substantially independent of the said physical parameters.

In this respect it is of advantage that the electronic measuring and signal processing means are not intricate, and the mass flow of air, for example for the air/fuel mixture in an internal combustion engine with fuel injection, can be determined with great accuracy over a wide range of pressure, temperature and humidity variations. In order to illustrate the principle on which the invention is based, i.e. on the fact that the I-V curve of the corona discharge contains additional information at the form of the slope of the curve in the operating point of the discharge, a theoretical derivation will be given. For the previously given and following formulas relating to the gas discharge theory reference is for example made to the book "Dielectric Phenomena, electrical discharges in gases" by S. Whitehead, 1927, Ernest Benn Lim., Bouverie House, Fleetstreet, London, in particular pages 99-101, and 134, 135.

The formula which may be used for the corona discharge is:

$$I = C_i \cdot m \cdot V \cdot (V - V_s) \quad (9)$$

where I is the total ion current, $C_i$ is a constant which is dependent on the selected mechanical quantities, such as diameters and lengths of the measuring arrangement, m is the ion mobility, V is the applied voltage, and $V_s$ is the starting voltage at which the discharge begins.

Differentiation in respect of the voltage yields:

$$S = (dI/dV) = C_i \cdot m \cdot (2V - V_s) \quad (10)$$

where S is the slope in the operating point at the values I and V.

Combining (9) and (10) yields:

$$V_s = V \cdot (SV - 2I/SV - I) \quad (11)$$

and combining (10) and (11) yields:

$$m = 1/C_i \cdot S/V \cdot (SV - I/SV) \quad (12)$$

Thus, the ion mobility is expressed in terms of the measuring quantities S, V and I.

Applying formula (12) to formulas (6), (7) and (8) now reveals that by measuring the said quantities, as the case may be supplemented with a density measurement and the measurement of i, a calculating unit with amplifiers and multiplier circuits, using the correct formula, is capable of providing an output quantity which represents the desired gas velocity, the volume flow or the mass flow of the gas to be measured, while the physical parameters relating to the gas are eliminated.

For constant I-control and constant V/I-control and for atmospheric air it is found that the factor $(SV - I)/SV$ varies only slightly, so that a fairly accurate flow meter can already be obtained by assuming that said factor is constant, which substantially simplifies the calculating unit.

Formulas (6) and (7) thus have the value constant.S.i. If now an S-measurement is performed with a constant dI, this value will be:

$$\text{constant} \cdot (i/dV) \tag{13}$$

so that only i and dV need be measured and divided by each other.

Figure 2:
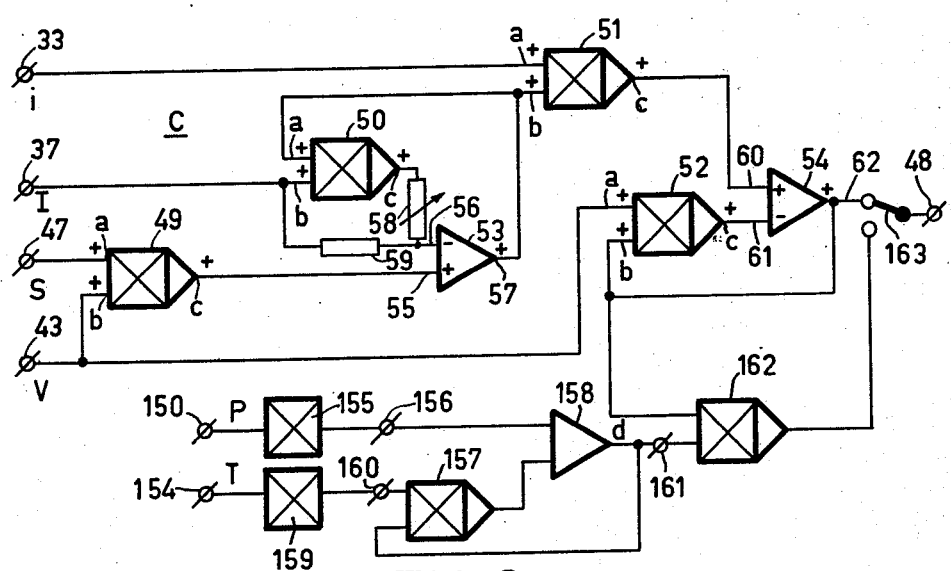
Figure 3:
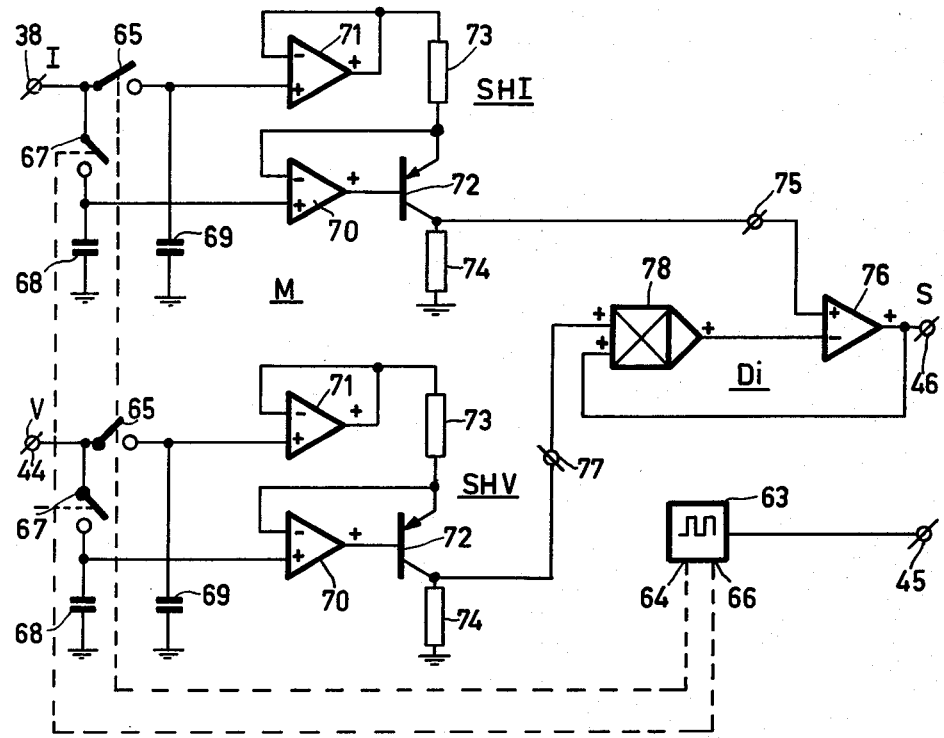
Figure 4:
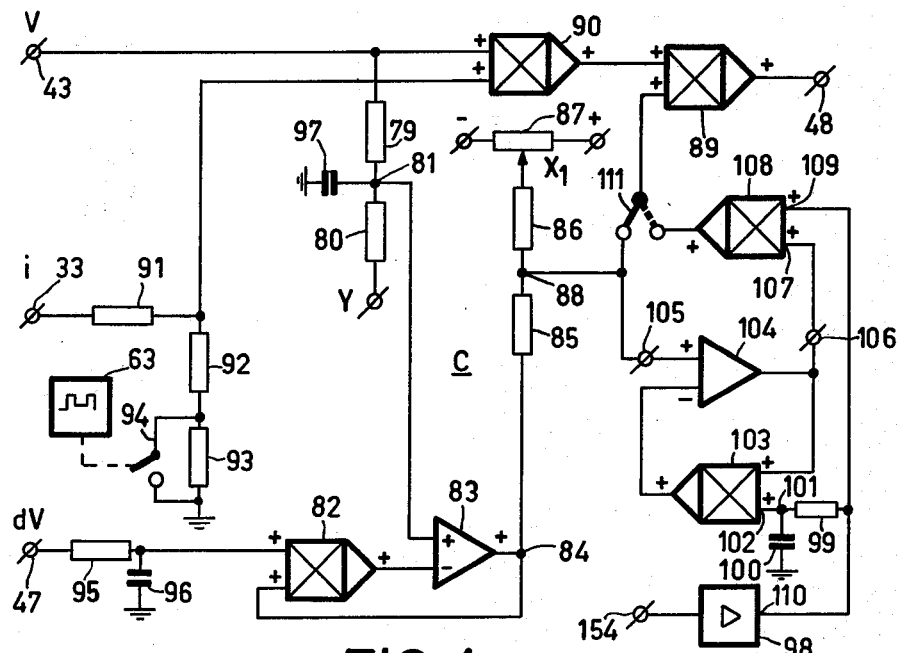

The invention will now be described in more detail with reference to the accompanying drawing in which:

FIG. 1 shows an ionisation flow meter with electronic means in accordance with the invention, FIG. 2 shows a calculating unit for use in the flow meter of FIG. 1, FIG. 3 shows the circuit diagram of a modulator for a flow meter in accordance with the invention, and FIG. 4 shows a calculating unit for a flow meter for atmospheric air constructed in accordance with the invention.

FIG. 1 schematically shows an ionisation flow meter comprising a tube 1 through which the gas to be measured flows, a high voltage source 2, and a measuring device 3. The gas, whose flow is to be measured expressed a gas velocity, volume flow, or mass flow, is supplied to the tube 1 at the inlet 4 and flows, as is indicated by the arrow 5, to the outlet 6 of the tube. A rod 7 is mounted in the tube on thin aerodynamically shaped insulators 8 and 9. The rod 7, which extends in the axial direction, is electrically connected to the high voltage source 2 which has a ground connection 12 and a control input 13, by means of a connection 10 through the insulator 9 and the tube wall via a terminal 11. The rod 7 comprises a disc 14, which in the present embodiment serves as an anode and constitutes the ion source. The cathode is a metal cylinder consisting of two parts 15 and 16, which is isolated from the tube 1 via an insulating sleeve 17. The two parts 15 and 16 are insulated from each other by a gap 18. Both the disc 14 and the gap 18 are situated in a cross-section of the tube 1. As a result of the applied high voltage V the disc 14 produces positive ions in the surrounding gas, which ions at zero gas velocity migrate to the cylinder 15 and to the cylinder 16 in equal numbers indicated by 19 and 20 owing to the electric field between the rod 7, the disc 14 and the cylinders 15, 16. The ions which reach the cylinder 15 give rise to a current $i_1$, which is available at a terminal 21, whereas the ions which reach the cylinder 16 give rise to a current $i_2$, which is available at a terminal 22. A total current I equal to the sum of $i_1$ and $i_2$ is returned to ground via measuring resistors.

Thus, the cathode is not constituted by one integral cylinder of a resistance material as in the said known flow meter, but comprises two cylinders of a higher conductive material which are isolated from each other by a narrow insulation gap, which apart from the shape 18 shown in FIG. 1 may also have a zigzag shape symmetrically situated on both sides of the cross-section 14–18. In respect of the ion distribution and the ion beam deflection D all these types of cathode do not differ from each other.

The measuring device 3 comprises measuring circuits for the difference current i, the total current I and the voltage V and further it comprises the modulator M and the calculating unit C.

The measuring circuit for i comprises a resistor 23 for the current $i_2$ from terminal 22, a resistor 24 of the sum value as resistor 23 for the current $i_1$ from terminal 21, and an operational amplifier 25 which is operated as a subtractor. The resistors 26, 27, 28 and 29 have the same value. The voltage across resistor 23, which is proportional to $i_2$, is applied to the non-inverting input 30 of amplifier 25, while the voltage across resistor 24, which is proportional to $i_1$, is applied to the inverting input 31 so that a voltage which is proportional to $i_2 - i_1 = i$ is available at the output 32. This signal i is applied to the input 33 of the calculating unit C.

The measuring device for the total current I comprises a resistor 34 and a buffer amplifier 35, at whose output 36 a voltage which is proportional to I is available for an input 37 of the calculating unit and for the input 38 of the modulator M.

The measuring device for the high voltage V comprises a voltage divider 39, 40 and a buffer amplifier 41, at whose output 42 a voltage proportional to V is available for the input 43 of the calculating unit and for the input 44 of the modulator. Furthermore, the modulator M is connected to the control input 13 of the source 2 for periodically changing the operating point of the corona discharge in the tube 1 by a small amount.

The high voltage source 2 may be of a type comprising a DC-DC converter, which is frequency or pulse-width controlled, for example for the constant-I control. Moreover, this control may be used in order to achieve the modulation about the operating point. A suitable operating range for the corona discharge is for example 7 to 14 kV at a current of 10 to 30 microamperes. At a constant current of 15 $\mu$A the voltage may for example range between 8 and 13 kV. As modulation, for example, 1.5 $\mu$A may be taken, the voltage then varying approximately 1%. Obviously this depends on the mechanical dimensions chosen and on the gas to be measured and its parameters.

For the aforementioned setting the slope S may range between 10 and 20 micro-amperes per kV.

From the data relating to I and V the modulator M derives a quantity which is proportional to S or 1/S and via the output 46 this quantity is applied to the input 47 of the calculating unit C. The computed value relating to the flow is then available at the output 48 the calculating unit C.

FIG. 2 shows the block diagram of the calculating unit C, which is, inter alia, adapted to realize the following relationship:

$$F_v = C_v \cdot i/V \cdot (SV - I/I) \tag{14}$$

where $F_v$ is the volume flow and $C_v$ a constant which equals $O/C_l \cdot C_m \cdot C_l$. Formula 14) is obtained by combining formulas (7) and (12).

Multipliers 49, 50, 51 and 52 satisfy the relationship $V_a \cdot V_b = \text{const.} \cdot V_e$, which means that the voltage at input a multiplied by the voltage at input b is proportional to the voltage at output c. For these multipliers, which may be combined with the operational amplifiers 53 and 54 types AD 534 of Analog Devices, may for example be used. If the entire measuring devices takes the form of an integrated circuit with current sources employing current mirrors, a multiplier may be used of the type $I_1 \cdot I_2 / I_4 = \text{constant } I_3$, such as the Raytheon 4200.

The operation is as follows. Via its output c the multiplier 49 supplies a voltage to the non-inverting input 55 of the amplifier 53, which voltage equals $K_1 \cdot S \cdot V$, where $K_1$ is a constant which contains the factors of S and V and the factor relating to multiplier 49. As a result of the negative feedback: output 57 of amplifier 53, input 50a, output 50c, resistor 58, inverting input 56 of amplifier 53, the voltage at input 55 and input 56 is maintained constant, so that input 56 carries the voltage $K_1SV$. If the voltage on output 57 is $V_o$, output 50c will supply a voltage $K_2 \cdot V_o \cdot I$, where $K_2$ contains the constants of the current I and of multiplier 50. The current in resistors 58 and 59 is the same, so that $$(K_2 \cdot V_o \cdot I - K_1 \cdot SV)/R_{58} = (K_1 \cdot SV - K_3 \cdot I)/R_{59} \quad (15)$$

Here $K_3$ is the factor for the current I, for $K_3I$ is the voltage of an input 37. From relationship (15) $V_o$ can be derived which is equal to $K_4 \cdot (SV - I)/I$.

For this purpose resistor 58 may for example be variable so as to enable the adjustment to be obtained for equal multiplication factors of SV and I.

Via its output 51c the multiplier 51 supplies the product $i \cdot V_o$ to the non-inverting input 60 of amplifier 54. Owing to the negative feedback: output 62 of amplifier 54, input 52b, output 52c, inverting input 61, the voltage at input 61 is also proportional to $i \cdot V_o$. If it is now assumed that the output voltage on output 62 is $U_o$ and the voltage at input 52a is $K_5 \cdot V$, obtained from terminal 43, then $K_5 \cdot V \cdot U_o = K_6 \cdot i \cdot V_o$, so that the product $i \cdot V_o$ is divided by V so as to obtain $U_0$.

It will be evident that the voltage available at terminal 48 satisfies the relationship as given by formula (14).

FIG. 2 furthermore shows an extension which enables the mass flow of a gas to be measured. As is known from formulas (7) and (8), the mass flow can also be obtained with formula (14) by multiplication by the density d. The density d is calculated from the physical quantities pressure and temperature, the pressure value being divided by the temperature value.

For this purpose there is arranged in the gas stream in FIG. 1 a pressure transducer 149, which is connected to an input 150 of the calculating unit C via a connection 151. A temperature transducer 152 is connected to an input 154 of the calculating unit by means of a connection 153.

In FIG. 2 a function generator 155 converts the measured pressure value at input 150 into a value which is proportional to the pressure P if the pressure range to be measured demands a linearisation. This P-value is applied to the multiplication input 156 which belongs to a divider which comprises a multiplier 157 and an amplifier 158. Similarly, the measured temperature value at input 154 is linearised with a function generator 159 and the resulting value, which is proportional to the absolute temperature T, is applied to a dividing input 160 of the divider, so that at output 161 a signal is available which is proportional to the gas density. The measured value, which represents the volume flow and is available at output 62, is applied to a multiplier 162, and so is the density value at output 161. The product of the two, i.e. the mass-flow value, is now available at output 48 via a switch 163.

FIG. 3 represents the block diagram of a modulator which may be used in the block M of FIG. 1. The modulator M comprises an oscillator 63, a sample-and-hold circuit SHI for the signal $K_3 \cdot I$, an identical sample-and-hold circuit SHV for the signal $K_5 \cdot V$, and a divider circuit $D_i$ which supplies a voltage proportional to S.

The oscillator 63 takes the form of a multivibrator and supplies a squarewave voltage between the values $V_t$ and zero. At zero voltage there is no signal at output 45 to the high-voltage source and this source supplies a high voltage V and a current I. The output 64 is connected to the switches 65 of SHI and SHV, which are open because of the "zero" state of the multivibrator. The inverting output 66 now carries a voltage corresponding to $V_t$ so that the switches 67 are closed and a voltage corresponding to V and I respectively appears on the capacitors 68 of the circuits SHV and SHI.

If oscillator 63 switches over to the other state, the voltage $V_t$ appears at output 45 and the high voltage source supplies a voltage V+dV and a current I+dI. Output 64 is now energized and output 66 is not energized, so that switches 65 are closed and switches 67 are opened. Consequently, a voltage corresponding to I+dI appears on capacitor 69 of SHI and a voltage corresponding to V+dV on capacitor 69 of SHV. Buffer amplifiers 70 and 71 are respectively connected to the capacitors 68 and 69. The output of buffer amplifier 70 is connected to the base of a transistor 72, while its inverting input is connected to the emitter of transistor 72. Between this emitter and the output of amplifier 71 a resistor 73 is included. The collector of transistor 72 is connected to ground by a resistor 74.

For SHI the voltage on the one end of resistor 73 is proportional to I+dI and that on the other hand is proportional to I, so that a current proportional to dI flows through the resistor to the emitter of transistor 72. Apart from a small base current, said current produces a voltage proportional to dI across resistor 74. This voltage is applied to the non-inverting input 75 of amplifier 76 belonging to the divider $D_i$. In a similar way SHV supplies a voltage proporptional to dV to the input 77 of a multiplier 78 of $D_i$. The divider $D_i$, which comprises the multiplier 78 and the amplifier 76, supplies to an output terminal 46 a voltage proportional to the ratio dI/dV, and thus to the slope S.

It is to be noted that if the dI-value is maintained constant, the circuit SHI and the divider $D_i$ may be dispensed with, so that the modulator M then only comprises oscillator 63 and the circuit SHV, input 77 being interconnected to output 46. Such a modulator is used in the calculating unit C, as described with reference to FIG. 4.

FIG. 4 shows a calculating unit adapted to be used in the ionisation flow meter in accordance with the invention for measuring the mass flow of atmospheric air. By the use of current control in the high-voltage source, so that I is constant, and furthermore modulating by varying I by a fixed amount dI, the calculating unit is simplified. Only the inputs 43 for V, 33 for i and 47 for dV are necessary. For the density, the following formula is used:

$$d = C_3 \cdot V(V + y + {}^x/S) \quad (16)$$

where x and y are constants, and for the mobility m the simplified formula in accordance with (12):

$$m = (1/c_i) \cdot (S/V) \cdot (C_{SV}) \quad (17)$$

where $C_{SV}$ represents the value $(SV-I)/SV$, which is assumed to be constant. Applying the formulas (8), (16) and (17) yields:

$$F_m = \quad (18)$$
$$\frac{O \cdot C_{SV} \cdot dI \cdot C_3}{C_1 \cdot C_m \cdot C_i \cdot I} \cdot \frac{1}{dV \cdot V} \cdot V(V + y + \frac{x}{dI} \cdot dV) \cdot V \cdot i$$

or simplified $$F_m = \text{const.}(V+y/dV+x_1) \cdot V \cdot i \qquad (19)$$

where $x_1$ is $x/dI$ and is constant because $x$ and $dI$ are constant.

In FIG. 4 an adding circuit is obtained by means of the resistors 79 and 80 that provides a voltage proportional to $V+y$ at point 81. This signal, together with a voltage which is proportional to $dV$, is applied to the dividing circuit consisting of multiplier 82 and amplifier 83. At the output 84 a voltage is available which is proportional to $(V+y)/dV$. Together with an adjustable voltage corresponding to the constant $x_1$ this voltage is applied to an adder circuit comprising resistors 85 and 86. The quantity $x_1$ is taken from the arm of a potentiometer 87 having connected to a positive and a negative supply voltage respectively. The value $x_1$ is consequently not only adjustable, but its polarity can also be selected. For various gases it is thus possible to correct the density measurement for moisture content or contaminants and for a slight temperature dependence.

For atmospheric air $x_1$ is generally negative. The sum voltage corresponding to $(V+y)/dV+x_1$ is taken from junction 88 and applied to the multiplier 89, which also receives the product of $i$ and $V$ from multiplier 90.

Thus, formula (19) has been realised with this calculating unit and at output 48 a voltage is now available which is proportional to the mass flow $F_m$ for air, independently of the temperature, density and moisture content of the air.

FIG. 4 also shows how the practical problem associated with the desired speed of mass flow measurement can be solved in respect of the time constants in the entire measuring circuit. The multiplier 90 and the circuits with resistors 91, 92, 93 and switch 94 provide the product of the values $V$, $I$ and $i$ in accordance with $V \cdot i/I$. Since in accordance with formulas (18) and (19) the current value $I$ is included in the constant, the product changes into $(V+dV)(i+di)/(1+dI/I)$ upon modulation. As is known $dI$ as well as $I$ are constant. Thus, for said product it therefore suffices to multiply the value $(V+dV)(i+di)$ by a constant factor. In FIG. 4 this is achieved by multiplying the value $i+di$ by this factor. For this purpose switch 94 is open for that part of the modulation period during which $V$ and $I$ appear. Resistors 92 and 93 then ensure that the maximum division ratio for the value $i$ is obtained. During the other part of the modulation period, i.e. when $V+dV$ and $I+dI$ appear, the switch is closed, so that a smaller division ratio is obtained because of the shortcircuit of resistor 93, in order to obtain the value $i+di$. The first division ratio divided by the second now equals $1+dI/I$. If, for example for the current ratio 10 percent is taken, resistor 91 may have a value of 10 kilo-ohms, resistor 92 a value 5.9 kilo-ohms, and resistor 93 a value of 1 kilo-ohm. Switch 94 is controlled by means of oscillator 63.

The circuit elements 79 to 87 provide the product of mobility and density. In order to obtain a sufficiently smoothed value for the slope S it is proposed to include a delay circuit in the form of a resistor 95 and a capacitor 96 in the arrangement of FIG. 4. The multiplier 82 then receives the value $dV$, as a measure of S, as a direct voltage, which direct voltage can thus follow step changes in the slope comparatively slowly. The delay circuit 95, 96 mainly serves to suppress noise and switching transients of the switches 65 and 67 in FIG. 3.

The delay time constant of this circuit combined with a time constant provided by the capacitors 68 and 69 with the associated circuit resistance provides an overall time constant. For the density measurement substantially the same value should be adopted, for which purpose a capacitor 97 is included between the junction 81 and ground, which together with the resistors 79 and 80 provides said overall time constant. This also results in a direct voltage at point 81, the ripple of the modulation $dV$ for example no longer being present. Because this lastmentioned component is very small anyway, the contribution V resulting from the voltage V and $V+dV$ respectively is substantially equal to V.

As a result of this dimensioning the product m.d can be formed in the correct manner. Both in formula (16) and in (17) $\overline{V}$ may be substituted for V, so that it can be seen in formula (18), that $\overline{V}$ in the numerator of the product m.d is eliminated against $\overline{V}$ in the denominator, so that the simplification for the product m.d is obtained in formula (19), represented in this formula by the term in brackets. As previously described these steps render this term independent of sudden variations in gas pressure. The product m.d in itself was already independent of the absolute value of the pressure.

The device of FIG. 4 thus provides a mass flow meter which rapidly responds to variations in mass flow. By extending the circuit a rapid response to temperature variations can also be obtained. For this purpose the product m.d, obtained in the above manner, is divided by a temperature function which responds equally slowly, and subsequently it is multiplied by the same function, but with a fast response, so that in the stable condition of the entire system the functions will cancel each other. The temperature function is obtained by measuring the temperature dependence of the product m.d.

The temperature of the gas can be measured by means of transducer 152 in FIG. 1. A function generator 98 is connected to input 154 in FIG. 4, which generator derives a signal from the measured value and the built-in function, which signal has the desired temperature dependence. This signal is passed to a delay circuit comprising a resistor 99 and a capacitor 100, whose time constant is equal to the time constant determined by components 79, 80 and 97. Output 101 is connected to the dividing input 102 of a divider, comprising a multiplier 103 and an amplifier 104. The multiplication input 105 is connected to the junction 88 for receiving the value of the product m.d. Output 106 of the divider is connected to input 107 of a multiplier 108, whose other input 109 is connected to output 110 so as to receive the temperature signal.

The output of multiplier 108 is connected to multiplier 89 via the switch 111, set to the dashed position.

A value for the mass flow of air is now obtained at output 48 which, with great accuracy is independent of the pressure, the temperature and the moisture content of the air, and which rapidly responds to sudden variations in gas parameters. The moisture content in air is unlikely to exhibit a transient within a few seconds. If this should occur, the flow meter can exhibit an error of at the most a few percent for some seconds.

The mass flow meter for air just described may be used under varying climatological conditions in fuel injection systems for motor cars because it is realized as an electronic circuit which can simply be manufactured in the form of an integrated circuit, and because of its high precision.

What is claimed is:

1. In an ionisation flow meter for gases in which an ion beam is produced between an anode and a cathode and is deflected as a result of the passage of the gas to provide first and second currents determined by the deflection of the ion beam, the improvement comprising, a high-voltage source connected to the anode and cathode for generating an ion current therebetween, and a measuring device for measuring the deflection and for producing a signal quantity which is proportional to the gas flow, the measuring device comprising a voltage measuring device for measuring the voltage V between the anode and cathode, a first current measuring device for measuring the total ion current I, a second current measuring device for deriving a difference current i which is determined by the difference of said first and second currents to provide a measure of the ion beam deflection, a calculating unit including operational amplifiers and multiplication circuits and having inputs for the quantities measured and an output for said signal quantity, a modulator coupled to the high-voltage source which periodically varies the operating point of the current I and the voltage V on the I-V curve by an amount dI for the current and dV for the voltage and supplies a signal to a further input of the calculating unit which is a measure of the slope S, the slope S being defined as dI divided by dV at the operating point, the calculating unit deriving from the measured quantities said signal quantity which is proportional to the flow rate of the gas and which is independent of pressure and temperature, using a corona current formula I as a function of V and a deflection formula i as a function of the deflection.

2. An ionisation flow meter as claimed in claim 1 wherein the calculating unit includes means providing a multiplication constant which is proportional to the cross-section of the gas stream so that said signal quantity is indicative of the volume flow of the gas.

3. An ionisation flow meter as claimed in claim 2 wherein the calculating unit includes means providing a multiplication factor which is proportional to the density of the gas so that said signal quantity is indicative of the mass flow of the gas.

4. An ionisation flow meter as claimed in claim 3 wherein the calculating unit includes an input for receiving a signal from a pressure transducer and an input for receiving a signal from a temperature transducer, said transducers being arranged in the gas stream, and wherein the calculating unit includes means for calculating the gas density from the measured pressure value, the measured temperature value and the gas constants.

5. An ionisation flow meter as claimed in claim 3 wherein the calculating unit includes means for calculating the gas density from the electrical quantities applied to the inputs.

6. An ionisation flow meter as claimed in any of the preceding claims wherein the calculating unit comprises multipliers, which derive a value $V \cdot i/1$ from the measuring values of V, I and i, which value is a factor in the signal quantity.

7. A mass flow meter as claimed in claim 6 wherein the calculating unit comprises multipliers which derive a signal with a value $m \cdot d$ which is proportional to the product of the mobility m of the gas ions and the gas density d, and the measuring device includes time-constant circuits for these quantities such that the time constants in the measuring device for measuring these quantities are substantially equal, whereby the value $m \cdot d$ is substantially independent of sudden pressure variations of the gas.

8. A mass flow meter as claimed in claim 7, characterized in that a temperature transducer is arranged in the gas stream, means connecting the transducer to an input of the calculating unit that is coupled to a function generator which in turn supplies a temperature-dependent signal to one input of a multiplier and to a time delay circuit having a time constant equal to the time constant of the value $m \cdot d$, means connecting the output of the time delay circuit to a dividing input of a divider having a multiplication input that receives the signal with the value $m \cdot d$, and means connecting the output of the divider to the other input of the multiplier whereby the multiplier supplies a signal which is independent of the temperature of the gas.

9. A mass flow meter as claimed in claim 5 for measuring atmospheric air of variable pressure, temperature and humidity, wherein the high-voltage source comprises a control unit which maintains the total ion current I constant, the modulator periodically supplies a signal to a control input of the high-voltage source so that the current I varies by a fixed amount dI, and the modulator comprises a measuring input for the high voltage V and derives a signal dV corresponding to dI from said voltage and which is a measure of the slope S, and wherein the calculating unit calculates the gas density d of the air in accordance with the formula $d = C3 \cdot V(V + y + x/S)$, where C3, y and x are constants, so that at the output of the calculating unit a signal quantity is available which is proportional to the mass flow of air and which is substantially independent of said pressure, temperature and humidity parameters.

10. An ionisation flow meter as claimed in claim 1 wherein the cathode comprises first and second coaxial metal cylinders axially aligned and insulated from one another and the anode comprises a rod located along the axis of the first and second cylinders.

11. A mass flow metter as claimed in claim 7 for measuring atmospheric air of variable pressure, temperature and humidity, wherein the high-voltage source comprises a control unit which maintains the total ion current I constant, the modulator periodically supplies a signal to a control input of the high-voltage source so that the current I varies by a fixed amount dI, and the modulator comprises a measuring input for the high voltage V and derives a signal dV corresponding to dI from said voltage and which is a measure of the slope S, and wherein the calculating unit calculates the gas density d of the air in accordance with the formula $d = C3 \cdot V(V + y + x/S)$, where C3, y and x are constants, so that at the output of the calculating unit a signal quantity is available which is proportional to the mass flow of air and which is substantially independent of said pressure, temperature and humidity parameters.

12. A measuring device for use with an ionisation flow meter that comprises first and second electrodes adapted to be coupled to a source of high voltage for establishing an ion beam current therebetween and mounted in a tube through which a gas to be measured flows and which provides at first and second terminals first and second currents determined by the deflection of the ion beam in response to said gas flow, the measuring device comprising, a first input means for coupling to said high-voltage source for deriving a first signal proportional to the high-voltage V applied to said first and second electrodes to establish the ion beam current, a current measuring circuit for coupling to said first and second meter terminals for deriving a second signal determined by the total ion beam current I and a third signal determined by the difference current i of the first and second currents at said first and second meter terminals, a modulating unit having first and second input terminals coupled to receive said first and second signals and means for deriving at first and second output terminals a control signal for modulating the current and voltage of the high-voltage source by an amount dI and dV, respectively, and a fourth signal which is determined by the slope S of the I-V characteristic curve, respectively, the slope S being defined as dI divided by dV, and a calculating unit having input means for receiving said first, second, third and fourth signals and means for deriving at an output terminal thereof a signal quantity proportional to the flow rate of the gas and which is substantially independent of gas pressure and temperature.

13. A measuring device as claimed in claim 12 wherein the calculating unit comprises, means for producing a constant factor determined by the cross-section of the gas stream in said tube, means responsive to said first, second and fourth signals for deriving a further signal that is proportional to the ion mobility, and means for combining said further signal with said third signal to derive at said calculating unit output terminal a signal quantity indicative of the volume flow of the gas.

14. A measuring device as claimed in claim 13 wherein the calculating unit further comprises, a pair of input terminals for receiving fifth and sixth signals proportional to the pressure and the temperature, respectively, of the gas, a divider responsive to said fifth and sixth signals for deriving a signal determined by the gas density, and a multiplier responsive to the density signal and to said volume flow signal for deriving an output signal indicative of the mass flow of the gas.

15. A measuring device as claimed in claim 12 wherein the calculating unit comprises, means for producing a constant factor determined by the cross-section of the gas stream in said tube, and means responsive to said first and fourth signals for deriving a signal proportional to the gas density.

16. A measuring device for use with an ionisation flow meter that comprises first and second electrodes mounted in a tube through which a gas to be measured flows and adapted to be coupled to a source of high-voltage for establishing a constant ion beam current I therebetween modulated by a small fixed amount dI with said meter producing at first and second terminals first and second currents determined by the deflection of the ion beam in response to said gas flow, the measuring device comprising, a first input means for coupling to said high-voltage source for deriving a first signal proportional to the high-voltage V applied to said first and second electrodes to establish the ion beam current, a current measuring circuit for coupling to said first and second meter terminals for deriving a second signal determined by the difference current i of the first and second currents at said first and second meter terminals, a modulating unit having an input terminal coupled to receive said first signal and including means for deriving respectively at first and second output terminals a control signal for modulating the current and voltage of the high-voltage source by said amount dI and by an amount dV, respectively, and a third signal which is proportional to the value dV and thus to the slope S of the I-V characteristic curve at its operating point, and a calculating unit including input means for receiving said first, second and third signals and means for combining said signals to derive at an output terminal thereof a signal quantity proportional to the mass flow of the gas and which is substantially independent of the temperature, density and moisture content thereof.

17. A method of measuring the flow of a gas in a tube that includes first and second electrodes energized by a modulated high-voltage source to produce a corona discharge ion beam current therebetween having an I-V characteristic curve modulated by small amounts dI and dV at its operating point and further producing first and second currents determined by the deflection of the ion beam caused by the gas flow, the method comprising, producing first, second and third signals proportional to the high-voltage V applied to said electrodes, the total ion beam current I and the difference current i between said first and second currents, respectively, producing a fourth signal proportional to the slope S of said I-V curve at said operating point, where the slope S is dI/dV, modulating the high-voltage source in response to said first and second signals by said amounts dI and dV, and electronically calculating the gas flow as a function of said first, second, third and fourth signals.

* * * * *

UNITED STATES PATENT AND TRADEMARK OFFICE
CERTIFICATE OF CORRECTION

PATENT NO. : 4,272,995
DATED : June 16, 1981
INVENTOR(S) : Marten P. Weistra

It is certified that error appears in the above—identified patent and that said Letters Patent is hereby corrected as shown below:

Col. 4, line 39, delete "fact"

Col. 6, equation (12), "(SV-I/SV)" should be --(SV-I)/SV--

Col. 8, equation (14), "(SV-I/SV)" should be --(SV-I)/SV--

Col. 12, line 9, "contribution V" should be --contribution $\overline{V}$--

Signed and Sealed this

Twenth-eighth Day of September 1982

[SEAL]

Attest:

*Attesting Officer*

GERALD J. MOSSINGHOFF

*Commissioner of Patents and Trademarks*